(12) United States Patent
Mankame et al.

(10) Patent No.: US 9,884,436 B2
(45) Date of Patent: *Feb. 6, 2018

(54) METHOD FOR MAKING A CURVED SANDWICH STRUCTURE USING A RECONFIGURABLE UV SOURCE MOUNTING ELEMENT

(71) Applicant: GM GLOBAL TECHNOLOGY OPERATIONS LLC, Detroit, MI (US)

(72) Inventors: Nilesh D. Mankame, Ann Arbor, MI (US); Elisabeth J. Berger, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 603 days.

This patent is subject to a terminal disclaimer.

(21) Appl. No.: 14/255,478

(22) Filed: Apr. 17, 2014

(65) Prior Publication Data

US 2016/0214284 A1 Jul. 28, 2016

(51) Int. Cl.
*B29C 35/02* (2006.01)
*B29C 35/08* (2006.01)
(Continued)

(52) U.S. Cl.
CPC ...... *B29C 35/0266* (2013.01); *B29C 35/0805* (2013.01); *B32B 37/24* (2013.01);
(Continued)

(58) Field of Classification Search
CPC ............ B29C 35/0266; B29C 35/0805; B29C 2035/0827; B60R 19/03; B60R 21/34;
(Continued)

(56) References Cited

U.S. PATENT DOCUMENTS

| 4,387,920 A | 6/1983 | Slaughter et al. |
| 4,504,534 A | 3/1985 | Adachi et al. |

(Continued)

FOREIGN PATENT DOCUMENTS

EP 1 300 293 A1 4/2003

OTHER PUBLICATIONS

Eldridge, David "DuPont shows auto composite impact beam at K preview" Plastics News, European Plastics News, Jun. 14, 2013.
Strano, M. et al. "Non-Conventional Technologies for the Manufacturing of Anti-Intrusion Bars" Politecnico di Milano, Dipartimento di Meccanica, Italy, first online Jun. 12, 2010.
Strano, M. et al. "Non-Conventional Technologies for the Manufacturing of Anti-Intrusion Bars" Politecnico di Milano, Dipartimento di Meccanica, Italy, first online Jun. 12, 2010.

*Primary Examiner* — Robert J Grun
(74) *Attorney, Agent, or Firm* — John A. Miller; Miller IP Group, PLC

(57) ABSTRACT

A process for fabricating a curved vehicle impact sandwich beam including a micro-truss structure. The method includes positioning a mold in contact with a curved bottom facesheet so that the mold and the bottom facesheet define a reservoir. The reservoir is filled with a liquid photo-polymer resin and a mask is positioned over the reservoir. A series of UV light sources are provided on a mounting member relative to the mask and the mounting member is flexed to conform to the shape of the bottom facesheet. Light from UV sources shines through apertures in the mask to cure and form polymerized struts in the reservoir to define the micro-truss structure formed to the facesheet.

21 Claims, 5 Drawing Sheets

(51) Int. Cl.
*B32B 37/24* (2006.01)
*B60R 19/03* (2006.01)
*B60R 21/34* (2011.01)
*B29K 105/00* (2006.01)
*B29L 31/30* (2006.01)

(52) U.S. Cl.
CPC ............. *B60R 19/03* (2013.01); *B60R 21/34* (2013.01); *B29C 2035/0827* (2013.01); *B29K 2105/0058* (2013.01); *B29L 2031/30* (2013.01); *B32B 2307/40* (2013.01); *B32B 2307/546* (2013.01); *B32B 2309/105* (2013.01); *B32B 2310/0831* (2013.01); *B32B 2605/08* (2013.01)

(58) Field of Classification Search
CPC . B32B 37/24; B32B 2605/08; B32B 2307/40; B32B 2307/546; B32B 2309/105; B32B 2310/0831; B29L 2031/30; B29K 2105/0058

See application file for complete search history.

(56) References Cited

U.S. PATENT DOCUMENTS

| | | |
|---|---|---|
| 4,978,562 A | 12/1990 | Wycech |
| 5,385,375 A | 1/1995 | Morgan et al. |
| 5,804,511 A | 9/1998 | Kelman et al. |
| 7,382,959 B1 | 6/2008 | Jacobsen |
| 7,819,462 B1 | 10/2010 | Owens |
| 8,268,510 B2 | 9/2012 | Rock et al. |
| 8,367,306 B1 * | 2/2013 | Doty .............. G02B 6/138 355/84 |
| 9,375,864 B2 | 6/2016 | Hundley et al. |
| 2008/0048462 A1 | 2/2008 | Zabik |
| 2013/0038076 A1 | 2/2013 | Benvenuto et al. |
| 2013/0143060 A1 * | 6/2013 | Jacobsen ............ B29C 71/02 428/594 |
| 2015/0111979 A1 * | 4/2015 | Yang ................ C08G 75/14 522/15 |

* cited by examiner

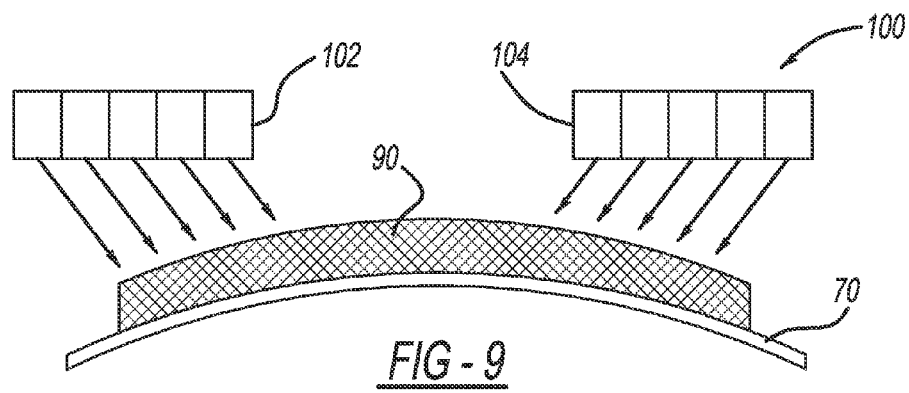
FIG-9
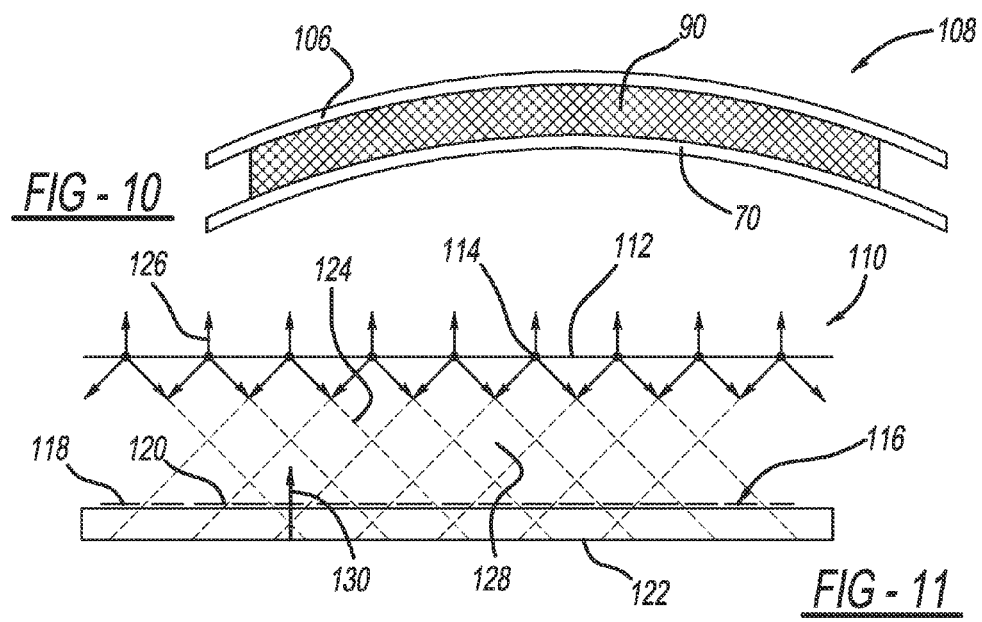
FIG-10
FIG-11
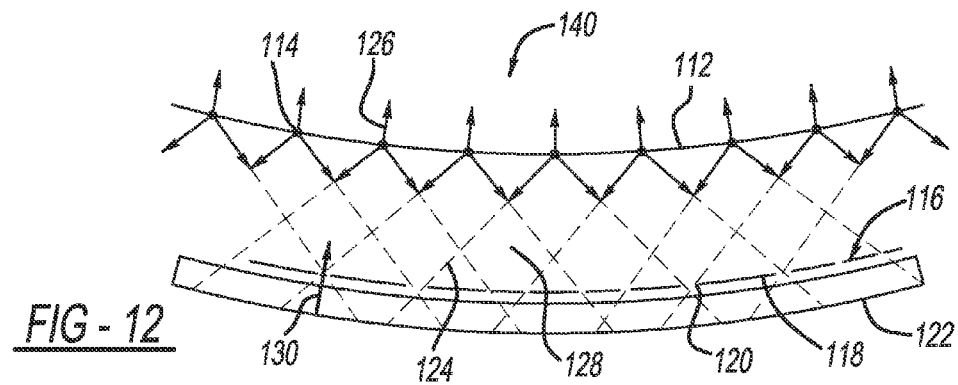
FIG-12

METHOD FOR MAKING A CURVED SANDWICH STRUCTURE USING A RECONFIGURABLE UV SOURCE MOUNTING ELEMENT

BACKGROUND OF THE INVENTION

Field of the Invention

This invention relates generally to a method for fabricating curved micro-truss sandwich structures and, more particularly, to a method for fabricating curved micro-truss sandwich structures using a reconfigurable mounting element on which UV light sources are provided.

Discussion of the Related Art

Modern vehicles are equipped with a number of impact beams providing structural integrity against collisions and impacts with other objects, such as other vehicles. More particularly, impact beams are traditionally used in vehicle designs to protect occupants from front, side and/or rear impacts by absorbing energy through deformation in the event of a vehicle crash and distributing the applied dynamic loads to other energy absorbing sub-systems on the vehicle. For example, it is known to provide impact beams in a front energy management or bumper assembly, a rear energy management or bumper assembly and side impact assemblies on a vehicle. Impact beams at the front and rear of the vehicle are usually referred to as bumper beams, and impact beams on the sides of the vehicle are sometimes referred to as anti-intrusion bars. In all cases, it is desirable to provide an impact beam with low mass, high flexural stiffness and strength, and high energy absorption per unit mass. The lightweight requirement is predicated by fuel economy standards and the fact that impact beams are located both very close to and very far from the vehicle's center of mass. Maximizing the flexural stiffness and strength is necessary if the beam is to survive low speed impacts without damage and transfer impact loads throughout the duration of a high speed impact event. Further, a high level of energy absorption translates into reduced load transfer to the occupants of the vehicle, thus increasing safety.

In one known vehicle front energy management system, an impact beam is comprised of a top and bottom facesheet in combination with an internal structural core for providing high energy impact resistance in a light weight and cost effective manner. Typically, the impact beam for such a system includes aluminum, steel, carbon fiber, etc. layers that are extruded, roll-formed, etc. A hard energy absorbing layer may be formed on the impact beam having the general shape of an outer fascia trim panel. A soft energy absorbing layer is then formed on the hard energy absorbing layer and the front fascia panel is then provided over the soft energy absorbing layer. The combination of the hard energy absorbing layer and the soft energy absorbing layer provides a transition between the impact beam and the front fascia panel so as to allow the system to conform to the desired shape of the front fascia panel which may have significant angles and forms required by the vehicle styling. The hard energy absorbing layer and the soft energy absorbing layer also provide a transition between the fascia panel and the impact beam to effectively absorb low speed impacts without significantly compromising system integrity.

It is known in the art to provide vehicle impact beams having sandwich structures. These prior art impact beams can generally be categorized into three designs, namely, hollow beams that are fully or partially reinforced with a polymer or metallic foam, single or dual-sided facesheets reinforced with a honeycomb-like cellular core, and formed composite impact beams. For hollow metallic or polymer matrix composite tube structures which are fully or partially reinforced with a lightweight foam core, the material used for the core can be either a metallic or polymeric foam that is bonded, mechanically attached or interference fit into the tube structure. The purpose of the core is to carry shear loads in the sandwich structures and absorb energy in the event of a low or high speed impact, which is a distinction dependent on the density and composition of the foam. The use of honeycomb or honeycomb-like ordered cellular cores to provide reinforcement to one or two flat facesheets have an open-sided sandwich designs and have honeycomb, discrete-stiffened or wine-crate structures extending from the front face of the impact beam back towards the passenger compartment of the vehicle. If a second facesheet is not included between the core and the passenger compartment, then the core material must be relatively dense since it provides most of the flexural stiffness to the structure adjacent to the shear load transfer.

For continuous or discontinuous fiber reinforced polymer matrix composite impact beams, the matrix material may either be a thermoplastic or thermosetting polymer introduced via resin transfer molding, compression molding, blow molding, or other similar fabrication processes.

It is also known in the art to fabricate a three-dimensional network of photopolymer waveguides comprising a unitary truss or lattice architecture, hereafter referred to equivalently as micro-truss or micro-lattice. For example, U.S. Pat. Nos. 7,653,279 and 7,382,959 disclose a process for fabricating such a micro-truss structure. Generally, the process includes providing a reservoir or mold filled with a volume of a curable monomer and covered by a mask including strategically positioned apertures. UV light sources are positioned relative to the mask and exposure to collimated UV light through the mask apertures forms a series of interconnected self-propagating photopolymer waveguides, referred to herein as struts, to form the truss or lattice architecture. Once the photopolymer waveguides are formed, the reservoir is emptied of the unpolymerized monomer which was not exposed to UV light. The micro-truss structure may then undergo a post-cure operation to increase the cross-link density in the photopolymer waveguides. This post-cure may be accomplished via a thermal cure, an additional exposure to UV light, an equivalent method or combination thereof.

SUMMARY OF THE INVENTION

The present disclosure describes a process for fabricating a curved sandwich beam including a micro-truss structure. The method includes positioning a mold in contact with a curved bottom facesheet so that the mold and the bottom facesheet define a reservoir. The reservoir is filled with a liquid photo-polymer resin and a mask is positioned over the reservoir. A series of UV light sources are provided on a mounting member relative to the mask and the mounting member is bent to conform to the shape of the bottom facesheet. Light from UV sources shines through apertures in the mask to cure and form polymerized struts in the reservoir to define the micro-truss structure formed to the sheet.

Additional features of the present invention will become apparent from the following description and appended claims, taken in conjunction with the accompanying drawings.

BRIEF DESCRIPTION OF THE DRAWINGS

FIGS. 6-10 show a series of fabrication steps for a curved sandwich panel having a micro-truss core;

FIG. 11 is an illustration of a micro-truss fabrication process including a mounting element;

FIG. 12 is an illustration of a micro-truss fabrication process showing the mounting element in a flexed state;

DETAILED DESCRIPTION OF THE EMBODIMENTS

Figure 1:
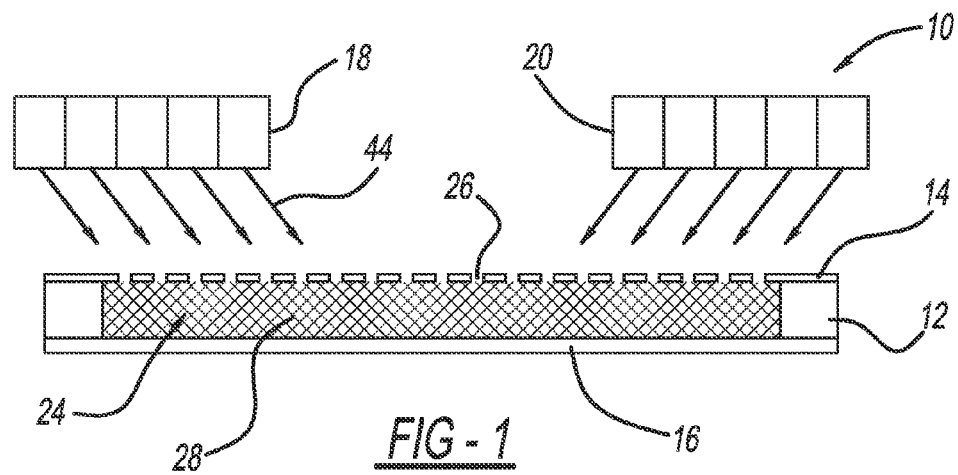
FIGS. 1-4 show a series of fabrication steps for a curved sandwich panel having a micro-truss core.

The following discussion of the embodiments of the invention directed to methods for fabricating curved impact sandwich beams using a UV mounting element is merely exemplary in nature, and is in no way intended to limit the invention or its applications or uses.

As will be discussed in detail below, the present invention proposes a number of structures and related methods for providing a beam, such as an impact beam for a vehicle, with a sandwich construction incorporating an architected core material, referred to herein as a micro-truss structure or micro-truss core. The architected core material is composed of a repeating set of ordered three-dimensional polymer waveguides. Although sandwich structures are known in the vehicle impact beam art, what differentiates the present invention from other designs is the use of and formation process for the micro-truss sandwich core. As will be discussed, a sandwich structure with an architected micro-truss core enables beam capabilities and performances that were heretofore not possible using known methods.

The micro-truss core material possesses increased stiffness and strength verses alternative stochastic sandwich core materials, such as metal or polymeric foams, given that it enables precise control of the material distribution and orientation. Micro-truss core materials can be manufactured at much lower costs as compared to other high-strength and high-stiffness core materials, such as metallic or composite honeycombs. Because the micro-truss core is formed in place and directly bonded onto curved surfaces, fasteners and angled faces, it eliminates the need for costly secondary machining and multi-stage bonding operations associated with honeycomb cores. The micro-truss fabrication process enables functional grading, spatial control of the physical and mechanical properties of the core in all three-dimensions using a single material, something which is not possible with all of the other sandwich core forms that have homogeneous physical and mechanical properties at different locations in the core. In a beam, functional grading can be used to provide enhanced structural support in localized regions of the beam, such as attachment points, the beam mid-span or likely impact loading locations. Polymer micro-truss core materials can be integrated into sandwich designs containing aluminum, steel, or carbon fiber reinforced polymer facesheets, or any combination thereof, without the need for corrosion prevention devices or coatings. This is not the case for core materials such as aluminum honeycombs or foams which require galvanic protection when applied to steels or carbon fiber reinforcement polymers. The surfaces of front and rear beams are often covered with a soft energy absorbing layer to prevent injury to pedestrians under low speed impact conditions. This energy absorbing material is added after fabrication of the beam, thus increasing part count and manufacturing complexity. In comparison, the same micro-truss process can be used to form both the soft energy absorption layer and the hard energy absorption layer by changing the thickness, orientation, density and chemical composition of the photopolymer waveguides in each layer. The formation of an integral energy absorbing layer on the outside of the beam during manufacture of the sandwich construction saves time, cost and reduces the associated part count.

The use of a sandwich construction, particularly one with a micro-truss core, also opens up the design space for beams to form geometries that cannot be manufactured using monolithic metal for fiber reinforced polymer composites alone. The sandwich design can circumvent inherent limits for extrusion, pultrusion, stamping, and laminating processes by utilizing simple shapes for the metal or composite facesheet materials to create a complex geometry sandwich.

Within the sandwich construction, the structure of the micro-truss core results in a higher stiffness and strength compared to prior art stochastic core materials. Additionally, the micro-truss architecture allows for the properties of the beam to be spatially tailored to meet anticipated loading conditions. The ability to functionally grade the performance of the micro-truss core throughout the beam ensures the highest level of structural efficiency, i.e., material is only placed where and in which orientation it is required. The method of fabrication presented herein also offers significant improvements over previous sandwich beam manufacturing methods. The net shape formation of the micro-truss results in a lower-cost structure as compared to an equivalent performance honeycomb core as a result of the labor-intensive machining and multi-stage bonding operations required for incorporation of the honeycomb structure. Furthermore, the same micro-truss fabrication process can be used to integrate additional parts, such as front and rear energy absorbing padding, into the structure of the beam cutting down on part counts and manufacturing time.

Along the length direction, the beam may have a non-prismatic cross-section, where the cross-section may vary along the length either by changing the thickness of the facesheets, the thickness of the core, or the density, architecture or composition of the core, i.e., functional grading. In certain embodiments of the invention, the beam has curvature along one axis such that the surface normal vectors of the sandwich cross-section are not parallel to one another along the length of the beam. In an additional embodiment, the beam may be straight so that all beam cross-section surface normals are parallel along the length dimension of the beam. In one embodiment, the width dimension of the beam is sealed against air or fluid flow such that the two facesheets comprising the outer surface of the beam form a closed perimeter. Alternately, the cross-section of the beam can be open such that the top and bottom facesheets do not connect and are attached only by the architected core.

In addition to the architected micro-truss material forming the core of the sandwich beam, other micro-truss materials may be incorporated at the top facesheet surface of the beam to function as an energy absorption padding material. These energy absorbing truss layers are supported only on one side by the facesheet, with the outer-facing surface unconstrained for later attachment to the front fascia. Typically, these energy absorbing truss materials are composed of different polymer chemistries compared to that used for the beam sandwich core such that the outer energy absorbing material is several orders of magnitude more compliant than the inner structural reinforcing core.

In the design of the beam, mechanical attachment or support hardware features may be added to the beam to couple it to the surrounding structure. Particularly, the micro-truss core may be formed directly around internally or externally threaded inserts that provide locations for mechanical attachments passing through one or both facesheet surfaces. Tow lug devices may also be added to the sandwich beam structure to provide a hard point for tow line attachment. The tow lug devices may be fastened to the beam, using the aforementioned fastener integration process, or welded directly to the beam if one of the sandwich facesheets is metallic.

Carbon fiber reinforced polymer matrix composites can be used to form the facesheets of the sandwich beam. However, the micro-truss fabrication process described herein is amenable to a variety of different materials including discontinuous carbon fiber composites, continuous or discontinuous glass fiber composites, unreinforced polymers, aluminum alloys, structural steels, or any combination thereof. This means that both facesheets in the beam may be composed of the same material or they may be composed of dissimilar materials. The latter case is highly beneficial when the critical property determining material selection (e.g. stiffness, mass, cost, formability, etc.) is different for both facesheets. However, if dissimilar materials are used for the facesheets, then the open cross-section design may be required to prevent galvanic corrosion or similar material capability issues between the facesheets themselves and not the core.

The micro-truss core structure in the sandwich beam is composed of an ordered three-dimensional network of self-propagating polymer waveguides grown from a photo-monomer resin using a controlled exposure to collimated UV light sources at specified orientations through a plurality of apertures in a mask. Any UV-curable photo-monomer or blend thereof that displays the self-propagation phenomenon can be used to form the micro-truss or micro-lattice architecture. Alternatively, the micro-truss may be formed using the aforementioned photo-polymerization technique and then converted or augmented via electro or electro-less plating, reverse casting, vapor deposition, oxidation, dip coating, sputtering, or other suitable process into a hollow or solid metallic, ceramic, or polymer material different from the initial photopolymer. In certain embodiments of the beam manufacturing process, the micro-truss core is grown directly on one of the two sandwich facesheets. The second facesheet is then joined to the core using an adhesive material applied to the facesheet and/or the micro-truss. This adhesive may be composed of a single or multi-part paste for a continuous sheet of film. Additional materials, such as glass, scrim or syntactic fillers, may be added to the adhesive to maintain control of the bond line thickness.

Fabrication of the top and bottom facesheets is the first step for production of the beam being outlined herein. In one embodiment, these facesheets are composed of a continuous carbon fiber reinforced thermosetting or polymer composite produced from pultruded sections. In addition to these embodiments, the facesheets may be produced with discontinuous carbon fiber reinforcement, continuous or discontinuous glass fiber reinforcement, thermoplastic polymer matrices, unreinforced polymers, metallic facesheets, such as steels, aluminum alloys, etc., or any combination thereof. Consequently, manufacturing methods suited to each type of material may be used to produce the facesheets, including, but not limited to, thermoforming, spraying, injection molding, resin transfer molding, blow molding, stamping, casting, brake forming, roll forming, stretch forming, drawing, etc.

The top and bottom facesheets are formed in order to obtain an open or closed sandwich profile. Additionally, each facesheet may have a prismatic or non-prismatic cross-section along the beam length depending on the beam design and capabilities of the manufacturing processes used to form the beam, i.e., pultruded facesheets must be prismatic. Adhesion promoters or conversion coatings may also be applied to the surfaces of the facesheets in contact with the micro-truss core in order to form a high strength adhesive bond.

When the beam design contains curvature along one or more axis one method of introducing curvature is to start with flat facesheet materials and form them into the final curved shape after formation of the micro-truss core. In this case, the bottom facesheet does not contain any initial curvature prior to the growth of the core. The top facesheet is pre-shaped to match the final profile of the micro-truss core after it is fully cured. In additional embodiments, the facesheet materials posses an initial curvature, i.e., are not formed flat, and are fixtured into a flat shape during the micro-truss fabrication process, and then allowed to resume their curved shape upon release from the fixture.

The next step in the beam fabrication method is to form the micro-truss core shape directly onto one or both of the facesheets. The micro-truss formation process consists of placing a photo-monomer solution in a mold in contact with one of the facesheets, masking off a two-dimensional area on the opposite surface of the mold, exposing the liquid monomer to collimated UV light sources at specific orientations through the patterned mask, and then removing the mask, mold and excess monomer to produce a networked three-dimensional polymer structure bonded to the surface of one or both of the facesheets. If one facesheet in the sandwich structure is transparent at the wavelength of collimated light used to form the micro-truss, then the entire sandwich structure may be formed in a single operation by exposing the monomer to the UV light sources through the transparent facesheet. Subsequently, in this embodiment, the micro-truss forms and bonds onto both facesheet surfaces in contact with the monomer. If both of the facesheets are not transparent at the wavelength of collimated light used to form the micro-truss, then one facesheet must be affixed to the exposed micro-truss surface using a secondary process as described in the following sections.

If the facesheets are initially curved, then one of the facesheets must be fixtured in a flat configuration prior to formation of the micro-truss. Conversely, if the facesheets are initially flat, then no additional fixturing is required. If the sandwich beam contains a closed section design, then the mold containing the liquid monomer resin is not required on the closed side of beam, but only at the end points of the beam if these sections are open. During the micro-truss formation process, internally or externally threaded fastener inserts may be inserted into the liquid monomer to form bonded-in-place mechanical attachment points in the core.

Regardless of the curvature, transparency, and section properties of the beam, following formation of the core on one of the facesheets, the excess monomer resin, mold, and pattern mask are removed. The mold and the mask are then cleaned for re-use and the un-polymerized resin may be recycled and used to form the core of a subsequent beam. The three-dimensional networked polymer micro-truss structure is then post-cured using another exposure to UV light in order to fully polymerize the structure and fix it in a final configuration. Alternatively, the post-cure can be accomplished thermally, i.e., in an oven or using IR sources. Prior to this post-cure process, the micro-truss can still undergo deformation without introducing a residual stress state in the core. Therefore, if the beam is designed with curvature about one or more axis and the facesheet material is produced in a flat form, a fixture may be used to impart the required shape to the combination of the facesheet and the partially cured micro-truss core grown on top of the facesheet prior to post-curing of the core. Upon post-curing, this combination is removed from the fixture with the imparted curvature maintained by the stiff, post-cured micro-truss core and the deformed, e.g. plastically, facesheet that is bonded to the micro-truss core. The top facesheet is shaped separately to match the profile of the micro-truss core in the post-cured configuration and is bonded onto the post-cured micro-truss core. Conversely, if the facesheet is initially formed in a curved shape, and then the post-cure is performed free standing.

Once the micro-truss core is post-cured in its final shape and if both facesheets are not transparent, the sandwich beam is assembled by bonding the top facesheet to the micro-truss core and to the bottom facesheet if a closed section design is used. Whereas, the bond between the micro-truss core and the bottom facesheet is formed directly during a micro-truss formation process, the bond between the top facesheet and the micro-truss requires a secondary operation. In one embodiment, this secondary operation involves dip or roll coating a layer of paste adhesive onto the exposed top surface of the micro-truss and the bottom facesheet, and then placing the top facesheet in contact with this adhesive layer. The bond surface of the top and bottom facesheets may have a conversion coating, primer or other adhesion promoter applied prior to this assembly step. In additional embodiments, other bonding or joining operations may be used to affix the top facesheet to the micro-truss core and the bottom facesheet including, but not limited to, fusion welding, ultrasonic welding, adhesive film bonding, friction welding, spray adhesive bonding, interference fitting, mechanical attachment, etc. It is important to note that the same joining method does not need to be applied to the micro-truss/top facesheet interface as that applied to the top facesheet/bottom facesheet interface.

In an additional embodiment, one or more micro-truss structures are added to the top facesheet of the sandwich structure prior to bonding of the top facesheet to the beam. These additional micro-truss structures function as hard or soft energy absorption layers, facing outward from the vehicle to protect pedestrians who may come in contact with the beam during a dynamic event. These energy absorbing layers are added to the top facesheet in the exact same manner as the structural micro-truss core is added to the bottom facesheet.

Once the top facesheet is applied to the beam, finishing operations are applied to integrate the potential features described above. For instance, subtractive machining operations may be performed to trim sections of the beam or to provide holes for moisture drainage from the core. Additionally, support brackets or mechanical attachments may be added to allow the beam to interface with and transfer loads to surrounding vehicle components. If a tow lug is included in the beam design, it is also attached at this stage by mechanical fasteners or welding to a mechanical facesheet.

As discussed herein, forming a sandwich micro-truss structure while the facesheet on which the micro-truss structure is formed is flat creates a structurally hardened piece once the micro-truss structure is fully cured and both facesheets are bonded to it. For vehicle panels and other designs where it is desirable to then form the panel into a particular shape, bending of the rigid micro-truss structure introduces an undesirable stress state in the material. For example, if the rigid micro-truss structure is bent into a curved form, the integrity of the nodes formed by multiple intersecting polymer waveguides in the micro-truss may yield, fracture, or otherwise be structurally compromised. Further, bending and deformation of the fully cured micro-truss structure creates residual internal energy and stress within the structure, which may lead to performance issues, such as integrity, longevity, etc.

In one embodiment, the present invention proposes forming a curved micro-truss sandwich beam while the micro-truss structure is still in a green, partially cured and malleable state. FIG. 1 illustrates a process step 10 for this embodiment showing a mold 12 in which the micro-truss structure is formed, where the mold 12 defines an enclosure in which the liquid photo-monomer resin is contained. A thin flat bottom facesheet 16 is provided in association with the mold 12 and is the layer on which the micro-truss structure will adhere. The bottom facesheet 16 can be any material suitable for the beam being fabricated, such as aluminum, steel, thermoplastic polymers, carbon fiber composites, glass fiber composites, etc. A mask 14 including apertures 26 is positioned over the mold 12. Collimated ultraviolet (UV) light 44 from light sources 18 and 20, such as mercury arc lamps, is directed onto the mask 14 so that the collimated beams of light travel through the apertures 26 and irradiate the monomer resin in the mold 12 to form a micro-truss structure 24 composed of a plurality of interconnected partially cured self-propagating photopolymer waveguides 28 in the known manner. The exposure time and intensity of the light sources 18 and 20 are controlled so that the micro-truss structure 24 is only partially cured so that it is malleable and bendable in a green state while still in the mold 12.

Figure 2:
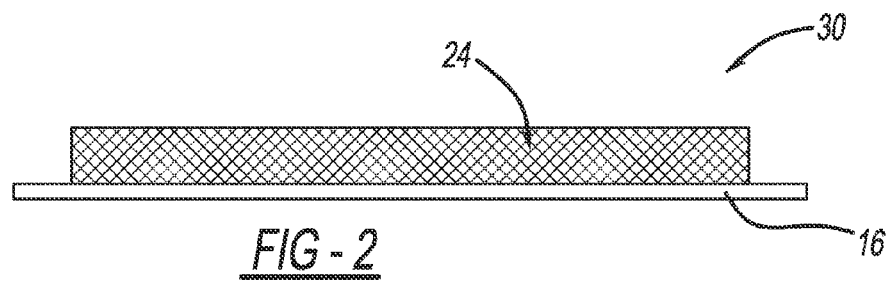

Once in this state, the uncured liquid monomer resin is removed from the mold 12 and the bottom flat facesheet 16 now including the partially cured micro-truss structure 24 secured thereto is separated from the mold 12. FIG. 2 shows a micro-truss assembly 30 including the bottom facesheet 16 and the micro-truss structure 24. As is apparent, the assembly 30 has been formed in a flat configuration.

Figure 3:
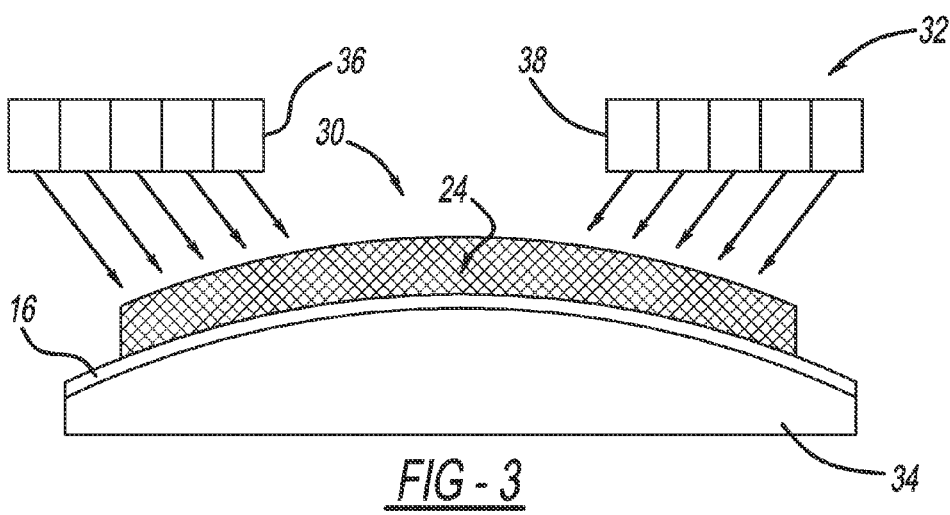

Because the facesheet 16 is thin it can be easily bent and conformed to a desired shape. The combination of the facesheet 16 and the partially cured micro-truss structure 24 can be easily deformed as well because the facesheet 16 is thin and the micro-truss structure 24 is malleable. FIG. 3 shows a next process step 32 depicting a curved fixture 34 on which the assembly 30 is positioned and bent to conform to the working surface of the fixture 34, as shown. The structure 30 can be formed into the curved configuration in any suitable manner, such as by suction, mechanical bending, etc., and can be held in this position by any suitable mechanical device (not shown) such as clamps. If the facesheet 16 is made of a ductile material, such as steel, it is plastically deformed during this step to make it conform to the working surface of the fixture 34. While the structure 30 is being held in this position, UV light from light sources 36 and 38 impinges the assembly 30 to fully cure the micro-truss structure 24 to its final rigid state. Because the micro-truss structure 24 is cured in the curved configuration, it will not have the internal stresses that otherwise would occur if the micro-truss structure 24 was curved to the desired shape after it is in a final cured state. Once the micro-truss structure 24 is fully cured and is configured into the desired shape, it is removed from the fixture 34.

Figure 4:
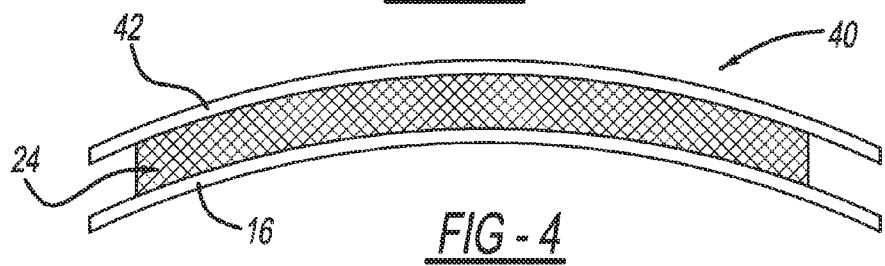

FIG. 4 shows a final curved sandwich beam 40 including the bottom facesheet 16, the cured micro-truss structure 24 and a top facesheet 42 secured to the micro-truss structure 24 opposite to the bottom facesheet 16 by a suitable bonding process, typically by gluing the nodes at the ends of the struts 28 to a bottom surface of the top facesheet 42. As with the bottom facesheet 16, the top facesheet 42 can be any thin material suitable for the sandwich beam being fabricated, such as aluminum, steel, thermoplastic polymers, composite laminates, carbon fiber composites, glass fiber composites, etc. It is noted that the top facesheet 42 can be of a different material than the bottom facesheet 16, which may be desirable for certain sandwich structures, such as impact beams.

Figure 5:
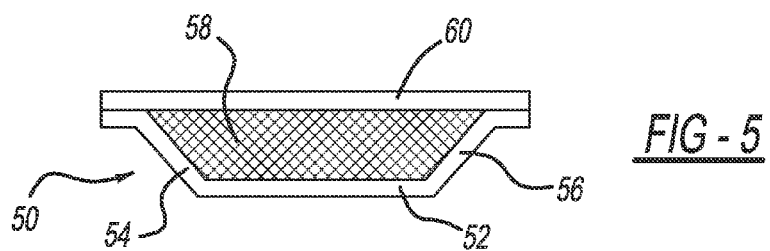
FIG. 5 is a cross-sectional type view of a micro-truss structure beam including closed sides.

The beam 40 is an open ended structure where sides or edges of the micro-truss structure 24 are not enclosed by panels or sheets. FIG. 5 shows a sandwich beam 50 where ends of the micro-truss structure are enclosed by thin sheets. Particularly, the beam 50 includes a closed bottom facesheet 52 including sidewalls 54 and 56 defining a cavity in which a micro-truss structure 58 is formed such as by the process discussed above. Although the beam 50 is shown in a flat configuration, it is noted that the beam 50 can be formed by the above described process where the bottom facesheet 52 is curved over the fixture 34 when the micro-truss structure 58 is in its green and partially cured state. Once the bottom facesheet 52 and the micro-truss structure 58 are in their final shape and the micro-truss structure 58 is cured, then a top facesheet 60 is secured to a top surface of the micro-truss structure 58 in the manner discussed above, and can be bonded to flanges extending from the sidewalls 54 and 56. Alternatively, the micro-truss structure 58 may be bonded to the top facesheet 60 and the flanges of the sidewalls 54 and 56 are welded to the corresponding edges of the top facesheet 60. It is noted that the same end result can be obtained by growing the micro-truss structure 58 on the facesheet 60, which his then bent over a fixture and the pre-shaped channel section is bonded/welded later.

Figure 6:
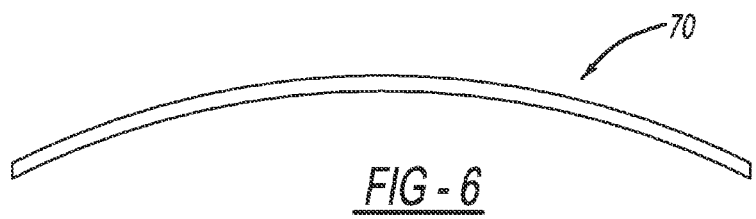
Figure 7:
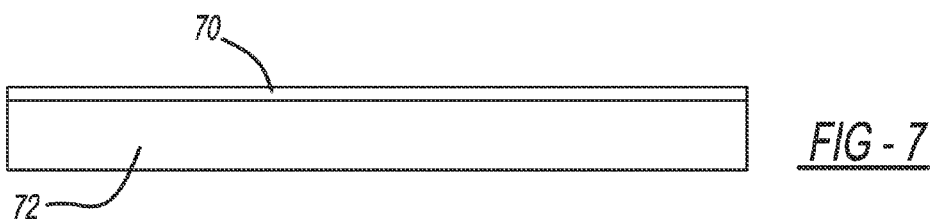

The above described process for forming a curved sandwich micro-truss beam can be modified according to another embodiment of the present invention. In this embodiment, the bottom facesheet for the sandwich beam starts out in a curved format, as shown by bottom facesheet 70 in FIG. 6. The curved facesheet 70 is then positioned on and made to conform to a flat fixture 72 by any suitable technique, such as suction, is forced into a flat configuration, as shown in FIG. 7. It is important to note that the material and geometry of the facesheet 70 are chosen so that it does not undergo a significant permanent deformation as a consequence of this step.

Figure 8:
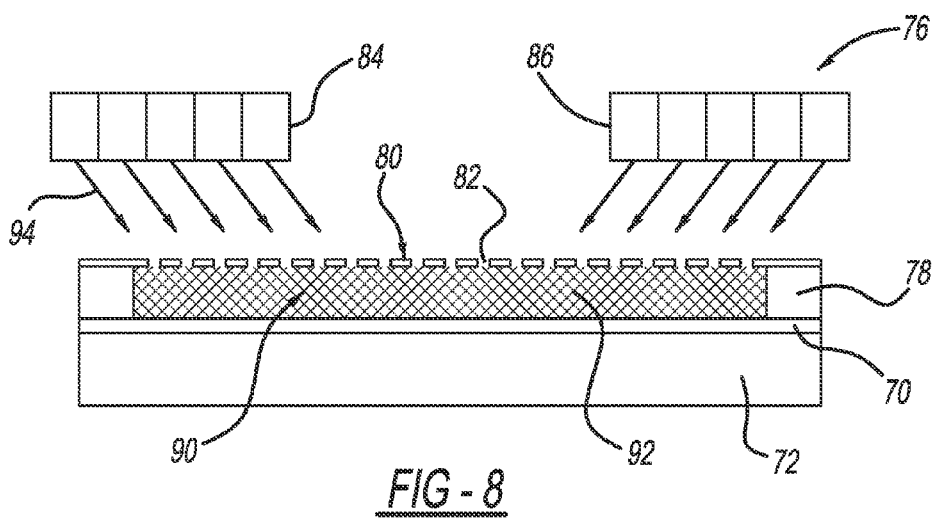

FIG. 8 is a process step 76 showing the bottom facesheet 70 secured to the flat fixture 72 and showing a mold 78 being positioned on the facesheet 70, where the mold 78 defines an enclosure for holding the liquid photo-monomer resin to form the micro-truss structure in the same manner as the mold 12 discussed above. A suitable mask 80 including apertures 82 is positioned on top of the mold 78 and as above, UV light sources 84 and 86, such as mercury arc lamps, shine collimated UV light 94 through the apertures 82 in the mask 80 into the uncured resin to form a micro-truss structure 90 composed of a series of self-propagating photopolymer waveguides 92. Also, as above, the light 94 from the light sources 84 and 86 only partially cures the resin so that the micro-truss structure 90 is in a green and malleable state, where it can be easily bent without affecting the structural integrity of the structure 90.

Once the partially cured micro-truss structure 90 is formed, the micro-truss structure 90 now adhered to the facesheet 70 is cleaned of any unused monomer and removed from the mold 78 and the fixture 72. Once the micro-truss structure 90 is removed from the fixture 72 the facesheet 70 will return or spring back to a curved shape shown in FIG. 6, which causes the partially cured micro-truss structure 90 to be bent accordingly. As discussed, because the micro-truss structure 90 is in a partially cured state, it readily conforms to the bent configuration of the facesheet 70 without resulting in significant residual or internal stresses in the structure.

FIG. 9 is an illustration of a process step 100 showing the micro-truss structure 90 and the bottom facesheet 70 in the curved configuration, and where UV light from sources 102 and 104 provides the final cure of the micro-truss structure 90 to provide the desired rigidity. Once the micro-truss structure 90 is fully cured, a pre-shaped top facesheet 106 is secured to a top surface of the micro-truss structure 90 opposite to the bottom facesheet 70 to form a final micro-truss sandwich beam 108 as shown in FIG. 10. As above, the curved bottom facesheet 70 or curved top facesheet 106 can include sidewalls to form a closed structure as shown in FIG. 5.

In an alternate embodiment, the bottom facesheet, such as the facesheet 16, may be a carbon fiber laminate or some other curable material that is first formed in a partially cured or malleable B-staged state, and then cured, typically by heat, to give it a final rigidity. For those types of bottom facesheets, the facesheet 16 when it is in the process step 10 shown in FIG. 1 may be in its partially cured state where it is also soft and easily bendable. Once the micro-truss structure 24 is formed to the facesheet 16 as the structure 30 shown in FIG. 2, and then bent onto the fixture 34 as shown in FIG. 3, both the micro-truss structure 24 and the bottom facesheet 16 can be subjected to a curing step to provide their final rigidity. Although the embodiment in FIG. 3 shows the micro-truss structure 24 being cured by UV light sources 36 and 38, in an alternate embodiment, the micro-truss structure 24 may be heat cured, such as in an oven, where both the micro-truss structure 24 and the facesheet 16 are cured at the same time. Alternately, a second step of curing the facesheet 16 may be required for a heat cure. That final curing of the facesheet 16 may occur with a final curing of the top sheet 42 for the structure 40 shown in FIG. 4.

The discussion above includes curing the micro-truss structure to its final rigid state after it has been removed from the mold so as to allow it to be formed into the desired curved shape before it is fully cured. However, in certain fabrication processes, it may be desirable to fully cure the micro-truss structure while it is in its original flat configuration, and possibly still in the mold. According to another embodiment of the invention, the micro-truss structure formed on the bottom facesheet is fully cured in a flat configuration using normal micro-truss structure fabrication techniques. If the resin is of a proper thermoset material and the bottom facesheet is of a proper type of material, heating the micro-truss structure and bottom facesheet above a known transition temperature $T_g$ for the particular materials causes those materials to become pliable where they can then be molded over a suitable fixture to the desired curvature while being held above the transition temperature. Once the micro-truss structure is in the desired curved shape, then the temperature can be reduced below the transition temperature $T_g$ where it will then return to its rigid cured state. The top facesheet, which would already be shaped to the desired configuration, can then be secured to the micro-truss structure in the manner discussed above. This process of heating the micro-truss structure after it has been fully cured to allow it to be conformed to the desired shape may have advantages above those of the post curing micro-truss structure processes referred to above because it will allow a repeated shape change to better fit within the processing needs of the sandwich micro-truss structure beam.

The discussion above also includes fabricating the micro-truss structure when the bottom facesheet on which the micro-truss structure is fabricated is in a flat configuration while the micro-truss structure is grown thereon. Other embodiments of the invention include fabricating the micro-truss structure for the sandwich beam while the facesheet is curved. FIG. 11 is an illustration 110 of a micro-truss fabrication process including a mounting element 112 on which a plurality of UV sources 114 are mounted. A mask 116 including UV opaque regions 118 and UV transparent regions 120 is provided relative to the mounting element 112 above a region 122. The region 22 is intended to represent all of the bottom facesheet and the mold forming the enclosure in which the liquid photo-monomer resin is deposited to define the micro-truss structure as discussed above. Collimated beams 124 emitted from each of the UV sources 114 are directed through the UV transparent regions 120 so that the beams 124 of UV light propagate through the mask 116 to form the polymerized struts of the micro-truss structure in the region 122, as discussed above. It is noted that the dots representing the UV sources 114 are intended to represent any configuration of UV light sources, such as lamps, lenses, mirrors and other optical elements. The crossing of the beams 124 defines cells 128 that depict the configuration of the micro-truss structure. Lines 126 define a direction normal to the mounting element 112 and line 130 defines a direction normal to a surface of the region 122.

FIG. 12 is an illustration 140 of a micro-truss fabrication process similar to the illustration 110, where like elements are identified by the same reference number. In the illustration 140, the mounting element 112 is shown in a curved or flexed configuration to have a predetermined shape suitable for the curved shape of the micro-truss sandwich beam being formed. As is apparent, the micro-truss cells 128 conform to the UV transparent regions 120 in the mask 116. The opaque portions 118 and the transparent portions 120 of the mask 116 are altered so that the now changed beams 124 are directed through the transparent portions 120.

The shape and/or curvature of the mounting element 112 may be different from that of the micro-truss structure being formed. Also, the UV sources 114 can be a combination of lenses, prisms, mirrors, etc. that split and direct the beams 124 into the desirable direction. Further, instead of a flexible mounting element, a reconfigurable, i.e., allowing a change in geometry, shape or orientation, mounting element may be used, such as a segmented surface whose segments can rotate or be locked relative to adjacent segments, such as a wiring track. Suitable examples include a flexible member, a segmented chain-like element where the individual elements may be held in their relative positions by friction or other locking mechanisms, or a member made of a shape memory material, such as a shape memory polymer, where the member may be heated to a transformation temperature, deformed into the desired shape, and locked into the shape by holding the member in the shape while it is cooled. Light beam modifying elements associated with the sources 114 may not be identical across the element 112 in that there may be differences in the angles of the beams 124, the number of the beams 124, the intensity of the beams 124, etc.

Figure 13:
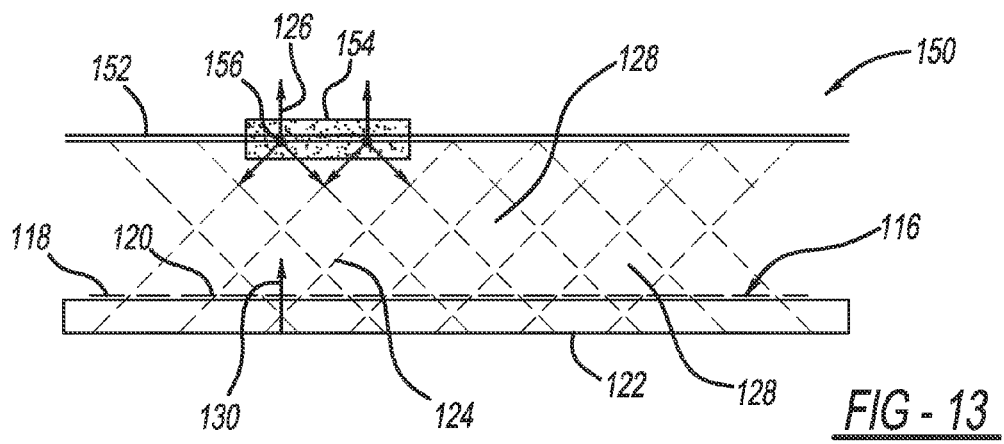
FIG. 13 is an illustration of a micro-truss fabrication process showing UV sources on a trolley secured to a curved mounting element, which may be fixed or reconfigurable.

FIG. 13 is an illustration 150 of another micro-truss fabrication process where like elements to the illustration 110 are shown by the same reference number. In this embodiment, the mounting element 112 is replaced with a track 152 on which is mounted a trolley 154 selectively moveable along the track 152, where the track 152 may be fixed or reconfigurable. A series of one or more light sources 156 are mounted to the trolley 154 and produce the collimated beams 124 directed through the UV transparent regions 120 in the mask 116. As the trolley 154 moves along the track 152, the light sources 156 will be controlled to provide the beams 124 in the proper direction. Any number or configuration of the light sources 156 on the trolley 154 that is suitable for a particular micro-truss structure can be employed. Based on this design, the number of the light sources 156 required to fabricate the entire micro-truss structure can be reduced where the micro-truss structure is fabricated in sections. Also, as above, the light sources 156 are intended to be any suitable configuration of optical elements to provide the collimated UV light beams.

Figure 14:
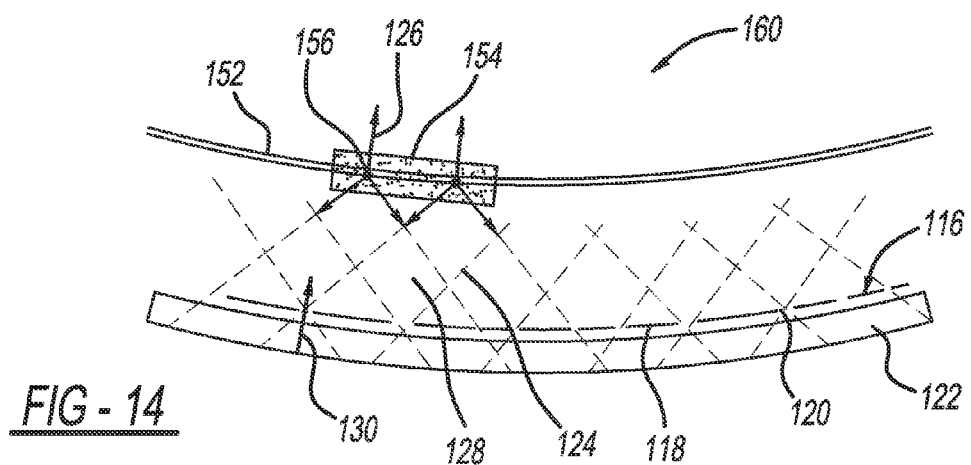
FIG. 14 is an illustration of a micro-truss fabrication process with a trolley on a curved mounting element.

FIG. 14 is an illustration 160 of a micro-truss fabrication process for a curved micro-truss structure showing the track 152 being curved to conform to the desired shape of the micro-truss sandwich beam. In the illustration 160, the mask 116 is curved to conform to the shape of the curvature of the track 152 and the desired shape of the micro-truss structure so that the beams 124 are aligned with the UV transparent regions 120. As above, the length of the opaque portion 118 and the mask 116 changes so that the transparent portions 120 align with the beams 124 as a result of the track 152 being reconfigured.

It is noted that the track 152 may be reconfigurable instead of being fixed. Further, the shape of the track 152 may not be the same as that of the micro-truss structure being made. Different parts of the curved micro-truss structure may be defined by different trolleys, such as a 4×4 source trolley may be used to cover the mostly flat parts of the structure quickly, whereas a 1×1 source trolley may be used for the parts of the micro-truss structure having a large curvature. The multiple trolleys may be operated simultaneously or sequentially. The combination of the UV source bank on the trolley 154, the track 152 and the mask 116 create the micro-truss geometry. One element may be used to correct some limitation of the others, such as the mask 116 may be used to correct a limitation of the trolley 154 and the track 152 combination. Instead of employing the track 152, the UV source bank may be attached to the end effector of a robot (not shown) that is programmed to trace a particular path or motion. Instead of a robot, the source bank may be attached to a regular or adjustable mechanism, such as a linkage, cam-based mechanism, etc. Further, instead of keeping the resin reservoir fixed and moving with the UV source bank relative to the reservoir to define a desired micro-truss pattern, the UV source bank may be fixed and the reservoir may be moved relative thereto to achieve the same goal.

Figure 15:
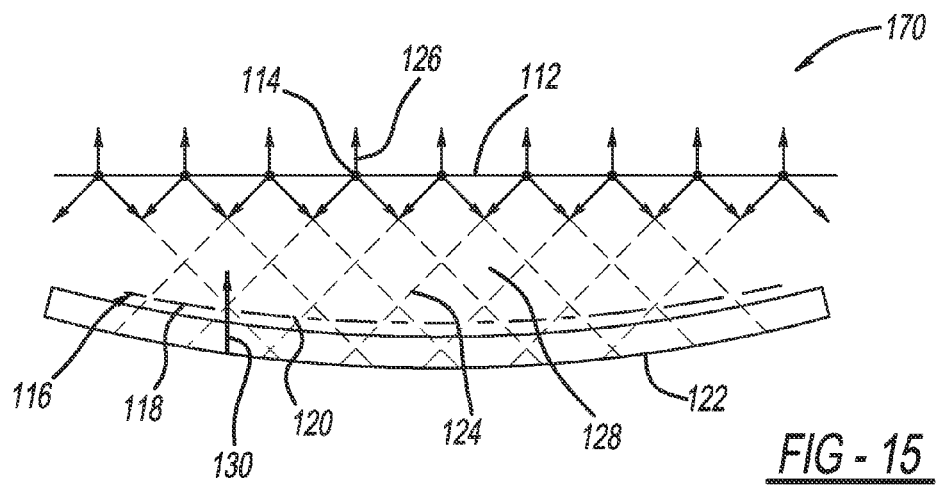
FIG. 15 is an illustration of a micro-truss fabrication process showing a straight mounting element and a mask in a curved configuration.

FIG. 15 is an illustration 170 showing a process for fabricating a micro-truss structure similar to the illustration 110, where like elements are identified by the same reference number. In this embodiment, the mounting element 112 is maintained in a flat or straight configuration, but the micro-truss structure being formed will have a curved configuration as shown by the region 122. In this configuration, the mask 116 is modified so that the opaque regions 118 and the transparent regions 120 allow the UV light beams 124 to pass through the transparent regions 120. As shown, the unit cell normal shown by the line 130 is not normal to the curved surface. Instead of UV sources being embedded in the mounting element 112, light beam modifying elements, such as lenses, prisms, mirrors, etc. that redirect and split an incident beam into multiple beams may be employed in the mounting element 112. The combination of the UV sources 114 and any other optical elements in association with the mask 116 create the micro-truss geometry.

Figure 16:
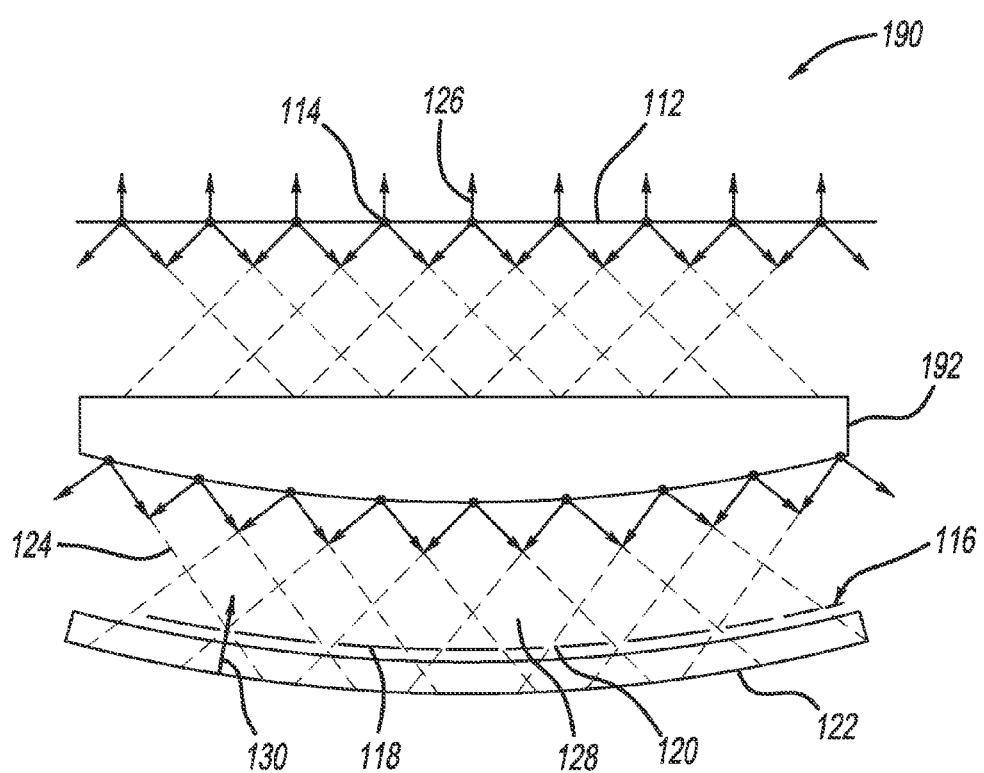
FIG. 16 is an illustration of a micro-truss fabrication process showing a mounting element in a straight configuration and a mask in a curved configuration with a lens therebetween.

FIG. 16 is an illustration 190 showing a process for fabricating a curved micro-truss structure similar to the illustration 170 where like elements are identified by the same reference number. The illustration includes the flat mounting element 112 and the curved mask 116. A lens 192 is positioned between the element 112 and the mask 116 to redirect the optical beams through the UV transparent regions in the mask 116 to form the micro-truss struts in a direction that conforms to the curvature of the micro-truss structure. By employing the lens 192, the line 130 is now normal to the mask 116. The lens 192 is used to map the beam pattern from the flat micro-truss beam to a curved micro-truss beam. The combination of the UV sources 114, the lens 192 and the mask 116 creates the micro-truss geometry, where one element may be used to correct some limitation of the other, such as the mask may be used to correct a limitation of the lens or UV sources. An array of repositionable mirrors may be used instead of the lens 192, where the position of the mirrors may be programmable.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for fabricating a micro-truss sandwich structure, said method comprising:
providing a bottom facesheet;
positioning a mold in contact with the bottom facesheet so that the mold and the bottom facesheet define a reservoir;
filling the reservoir with a liquid photo-polymer resin;
positioning a mask including ultraviolet (UV) transparent regions and UV opaque regions relative to the mold;
positioning a mounting member a predetermined distance from the mask, said mounting member including one or more optical elements providing ultraviolet (UV) light, wherein the one or more optical elements include one or more of a lens, a prism and a mirror; and
shinning light from the one or more optical elements onto the mask so that UV light shines through the UV transparent regions into the polymer so as to cure the polymer and form a micro-truss structure secured to the bottom facesheet.

2. The method according to claim 1 wherein providing a bottom facesheet includes providing a flat bottom facesheet, positioning a mask includes positioning the mask in a flat configuration and positioning a mounting member includes positioning the mounting member in a flat configuration.

3. The method according to claim 1 wherein providing a bottom facesheet includes providing a curved bottom facesheet, positioning a mask includes positioning the mask in a curved configuration and positioning a mounting member includes positioning a reconfigurable mounting member and configuring the geometry and positioning the reconfigurable mounting member in a curved configuration so that the micro-truss structure is formed in a curved format on the facesheet.

4. The method according to claim 1 wherein providing a bottom facesheet includes providing a curved bottom facesheet, positioning a mask includes positioning the mask in a curved configuration and positioning a mounting member includes positioning the mounting member in a flat configuration.

5. The method according to claim 4 further comprising a lens or an array of mirrors positioned between the mounting element and the mask, said lens or array of mirrors redirecting the UV light from the one or more optical elements to the mask.

6. The method according to claim 1 wherein the mounting member is a track and the at least one optical element is mounted on a trolley that is moveable on the track.

7. The method according to claim 6 wherein providing a bottom facesheet includes providing a curved bottom facesheet, positioning a mask includes positioning the mask in a curved configuration and positioning a mounting member includes positioning the mounting member in a curved configuration so that the micro-truss structure is formed in a curved format on the facesheet.

8. The method according to claim 1 wherein the one or more optical elements include a plurality of spaced apart of LEDs positioned on the reconfigurable mounting element.

9. The method according to claim 1 wherein the bottom facesheet is selected from the group consisting of aluminum, aluminum alloys, carbon fiber, metals, thermoplastic polymers and glass fibers.

10. The method according to claim 1 wherein the curved micro-truss sandwich structure is a vehicle structure.

11. The method according to claim 10 wherein the vehicle structure is an impact beam.

12. A method for fabricating a curved micro-truss sandwich structure for a vehicle, said method comprising:
providing a curved bottom facesheet;
positioning a mold in contact with the bottom facesheet so that the mold and the bottom facesheet define a reservoir;
filling the reservoir with a liquid photo-polymer resin;
positioning a curved mask including ultraviolet (UV) transparent regions and UV opaque regions relative to the mold;
positioning a reconfigurable mounting member a predetermined distance from the mask in a curved configuration, said reconfigurable mounting member including a plurality a spaced apart ultraviolet (UV) light sources, wherein the UV light sources are LEDs; and
shinning light from the light sources onto the mask so that UV light shines through the UV transparent regions into the polymer so as to cure the polymer and form a micro-truss structure secured to the bottom facesheet.

13. The method according to claim 12 wherein the reconfigurable mounting member is a track and the at least one optical element is mounted on a trolley that is moveable on the track.

14. The method according to claim 12 wherein the bottom facesheet is selected from the group consisting of aluminum, aluminum alloys, carbon fiber, metals, thermoplastic polymers and glass fibers.

15. A system for fabricating a micro-truss sandwich structure, said system comprising:

means for providing a bottom facesheet;
means for positioning a mold in contact with the bottom facesheet so that the mold and the bottom facesheet define a reservoir;
means for filling the reservoir with a liquid photo-polymer resin;
means for positioning a mask including ultraviolet (UV) transparent regions and UV opaque regions relative to the mold;
means for positioning and configuring the geometry of a mounting member a predetermined distance from the mask, said mounting member including one or more optical elements providing ultraviolet (UV) light; and
means for shinning light from the one or more optical elements onto the mask so that UV light shines through the UV transparent regions into the polymer so as to cure the polymer and form a micro-truss structure secured to the bottom facesheet.

16. The system according to claim 15 wherein the means for providing a bottom facesheet provides a flat bottom facesheet, the means for positioning a mask positions the mask in a flat configuration, and the means for positioning and configuring the geometry of a mounting member positions and re-shapes the mounting member in a flat configuration.

17. The system according to claim 15 wherein the for providing a bottom facesheet provides a curved bottom facesheet, the means for positioning a mask positions the mask in a curved configuration, and the means for positioning and configuring the geometry of a mounting member positions and re-shapes the mounting member in a curved configuration so that the micro-truss structure is formed in a curved format on the facesheet.

18. The system according to claim 15 wherein the means for providing a bottom facesheet provides a curved bottom facesheet, the means for positioning a mask positions the mask in a curved configuration, and the means for positioning a mounting member positions the mounting member in a flat configuration.

19. A method for fabricating a micro-truss sandwich structure, said method comprising:
providing a bottom facesheet;
positioning a mold in contact with the bottom facesheet so that the mold and the bottom facesheet define a reservoir;
filling the reservoir with a liquid photo-polymer resin;
positioning a mask including ultraviolet (UV) transparent regions and UV opaque regions relative to the mold;
positioning a mounting member a predetermined distance from the mask, said mounting member including one or more optical elements providing ultraviolet (UV) light; and
shinning light from the one or more optical elements onto the mask so that UV light shines through the UV transparent regions into the polymer so as to cure the polymer and form a micro-truss structure secured to the bottom facesheet, wherein providing a bottom facesheet includes providing a flat bottom facesheet, positioning a mask includes positioning the mask in a flat configuration and positioning a mounting member includes positioning the mounting member in a flat configuration.

20. A method for fabricating a micro-truss sandwich structure, said method comprising:
providing a bottom facesheet;
positioning a mold in contact with the bottom facesheet so that the mold and the bottom facesheet define a reservoir;
filling the reservoir with a liquid photo-polymer resin;
positioning a mask including ultraviolet (UV) transparent regions and UV opaque regions relative to the mold;
positioning a mounting member a predetermined distance from the mask, said mounting member including one or more optical elements providing ultraviolet (UV) light; and
shinning light from the one or more optical elements onto the mask so that UV light shines through the UV transparent regions into the polymer so as to cure the polymer and form a micro-truss structure secured to the bottom facesheet, wherein providing a bottom facesheet includes providing a curved bottom facesheet, positioning a mask includes positioning the mask in a curved configuration and positioning a mounting member includes positioning a reconfigurable mounting member and configuring the geometry and positioning the reconfigurable mounting member in a curved configuration so that the micro-truss structure is formed in a curved format on the facesheet.

21. A method for fabricating a micro-truss sandwich structure, said method comprising:
providing a bottom facesheet;
positioning a mold in contact with the bottom facesheet so that the mold and the bottom facesheet define a reservoir;
filling the reservoir with a liquid photo-polymer resin;
positioning a mask including ultraviolet (UV) transparent regions and UV opaque regions relative to the mold;
positioning a mounting member a predetermined distance from the mask, said mounting member including one or more optical elements providing ultraviolet (UV) light; and
shinning light from the one or more optical elements onto the mask so that UV light shines through the UV transparent regions into the polymer so as to cure the polymer and form a micro-truss structure secured to the bottom facesheet, wherein providing a bottom facesheet includes providing a curved bottom facesheet, positioning a mask includes positioning the mask in a curved configuration and positioning a mounting member includes positioning the mounting member in a flat configuration.

* * * * *